(12) United States Patent
Qiao et al.

(10) Patent No.: US 10,466,334 B2
(45) Date of Patent: Nov. 5, 2019

(54) METHODS AND SYSTEMS FOR SOUND SOURCE LOCATING

(71) Applicant: ZHEJIANG DAHUA TECHNOLOGY CO., LTD., Hangzhou, Zhejiang (CN)

(72) Inventors: Gang Qiao, Hangzhou (CN); Ya Gao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/246,428

(22) Filed: Jan. 11, 2019

(65) Prior Publication Data

US 2019/0162811 A1    May 30, 2019

Related U.S. Application Data

(63) Continuation of application No. PCT/CN2016/114014, filed on Dec. 31, 2016.

(30) Foreign Application Priority Data

Jul. 11, 2006 (CN) .......................... 2016 1 0555249

(51) Int. Cl.
 *G01S 3/802* (2006.01)
 *G01S 3/801* (2006.01)
 (Continued)

(52) U.S. Cl.
 CPC ................ *G01S 3/802* (2013.01); *G01S 3/80* (2013.01); *G01S 3/801* (2013.01); *G01S 3/803* (2013.01);
 (Continued)

(58) Field of Classification Search
 CPC . G01S 3/802; G01S 3/80; G01S 3/801; G01S 3/803; G01S 3/805; G01S 5/20;
 (Continued)

(56) References Cited

U.S. PATENT DOCUMENTS

2008/0130918 A1* 6/2008 Kimijima ................ H04S 1/007
                                                                381/107
2016/0284350 A1* 9/2016 Yun .......................... G10L 15/22

FOREIGN PATENT DOCUMENTS

CN          101030324 A       9/2007
CN          101030325 A       9/2007
(Continued)

OTHER PUBLICATIONS

International Search Report in PCT/CN2016/114014 dated Apr. 12, 2017, 5 pages.
(Continued)

*Primary Examiner* — Mark Fischer
(74) *Attorney, Agent, or Firm* — Metis IP LLC

(57) ABSTRACT

A method and system for locating a sound source are provide. The method may include detecting a sound signal of a sound by each of two audio sensors. The method may also include converting the sound signals detected by the two audio sensors from a time domain to a frequency domain. The method may further include determining a high frequency ratio of each of the sound signals in the frequency domain. The method may further include determining a direction of the sound source based on the high frequency ratios.

20 Claims, 12 Drawing Sheets

(51) Int. Cl.
   *G10L 17/00*   (2013.01)
   *G10L 17/06*   (2013.01)
   *H04R 1/40*    (2006.01)
   *H04R 3/00*    (2006.01)
   *G10L 25/51*   (2013.01)
   *H04R 1/02*    (2006.01)
   *G06K 9/00*    (2006.01)
   *G01S 3/80*    (2006.01)
   *G01S 3/803*   (2006.01)
   *G01S 3/805*   (2006.01)
   *G01S 5/20*    (2006.01)
   *G01S 5/30*    (2006.01)

(52) U.S. Cl.
   CPC .............. *G01S 3/805* (2013.01); *G01S 5/20* (2013.01); *G01S 5/30* (2013.01); *G06K 9/00845* (2013.01); *G10L 17/005* (2013.01); *G10L 17/06* (2013.01); *G10L 25/51* (2013.01); *H04R 1/028* (2013.01); *H04R 1/406* (2013.01); *H04R 3/005* (2013.01)

(58) Field of Classification Search
   CPC ..... G01S 5/30; G06K 9/00845; G10L 17/005; G10L 17/06; G10L 25/51; H04R 1/028; H04R 1/406; H04R 3/005
   See application file for complete search history.

(56) References Cited

FOREIGN PATENT DOCUMENTS

| | | |
|---|---|---|
| CN | 102110367 A | 6/2011 |
| CN | 102438189 A | 5/2012 |
| CN | 103116984 A | 5/2013 |
| CN | 103630872 A | 3/2014 |
| CN | 103901401 A | 7/2014 |
| CN | 104464750 A | 3/2015 |
| CN | 104469154 A | 3/2015 |
| CN | 104535964 A | 4/2015 |
| CN | 104777450 A | 7/2015 |
| CN | 204788411 U | 11/2015 |
| CN | 105301563 A | 2/2016 |
| JP | 2004325284 A | 11/2004 |
| JP | 2009296219 A | 12/2009 |
| WO | 2014182030 A1 | 11/2014 |
| WO | 2018010398 A1 | 1/2018 |

OTHER PUBLICATIONS

Written Opinion in PCT/CN2016/114014 dated Apr. 12, 2017, 5 pages.
First Office Action in Chinese Application No. 201610555249.8 dated Feb. 5, 2018, 9 pages.
The Extended European Search Report in European Application No. 16908720.2 dated Jun. 6, 2019, 9 pages.

* cited by examiner

200

METHODS AND SYSTEMS FOR SOUND SOURCE LOCATING

CROSS-REFERENCE TO RELATED APPLICATIONS

This application is a continuation of International Application No. PCT/CN2016/114014, filed on Dec. 31, 2016, which in turn claims priority of Chinese Patent Application No. 201610555249.8, filed Jul. 11, 2016, the contents of each of which are hereby incorporated by reference to its entirety.

TECHNICAL FIELD

The present disclosure generally relates to monitoring system, and more particularly, to methods and systems for sound source locating in monitoring system.

BACKGROUND

Monitoring system has been widely used in various industries, not only in communications, transportation, security but also other industry applications. With a consequence of continuous upgrading of demands in monitoring system, there is a demand of monitoring an object according to an occurrence of abnormal situation. Thus, it may be desirable to develop a source locating method and system that may make the monitoring system locate a sound source and control a camera of the monitoring system to obtain some images of the sound source.

SUMMARY

The present disclosure relates to a sound source locating method and system. According to one aspect of the present disclosure, a method for locating a sound source is provided. The method may include one or more of the following operations. A sound signal of a sound source may be detected by each of two audio sensors. The detected sound signals may be converted from a time domain to a frequency domain. A high frequency ratio of each of the sound signals in the frequency domain may be determined. A direction of the sound source may be determined based on the high frequency ratios of the sound signals in the frequency domain.

According to another aspect of the present disclosure, a system for locating a sound source is provided. The system may include a sound signal detection module, a sound signal conversion module, a sound signal analysis module, and a position determination module. The sound signal detection module may be configured to detect a sound signal of a sound. The sound signal conversion module may be configured to convert the detected sound signals from a time domain to a frequency domain. The sound signal analysis module may be configured to determine a high frequency ratio of each of the sound signals in the frequency domain. The position determination module may be configured to determine a direction of the sound source based on the high frequency ratios of the sound signals in the frequency domain.

According to another aspect of the present disclosure, a non-transitory computer readable medium embodying a computer program product is provided. The computer program product may include instructions that are configured to cause a computing device to detect, by each of two audio sensors, a sound signal of a sound source. The computer program product may also include instructions configured to cause the computing device to convert the detected sound signals from a time domain to a frequency domain. The computer program product may further include instructions configured to cause the computing device to determine a high frequency ratio of each of the sound signals in the frequency domain. The computer program product may further include instructions configured to cause the computing device to determine a direction of the sound source based on the high frequency ratios of the sound signals in the frequency domain.

In some embodiments, the audio sensors may be installed on a head of a ball camera.

In some embodiments, a distance between the two audio sensors may be smaller than a diameter of the ball camera.

In some embodiments, the high frequency ratios of the sound signals for each of the sound signals may be determined in the frequency domain by perform one or more of the following operations. Each of the sound signal may be divided into a plurality of frames. A high frequency ratio of each of the plurality of frames may be determined. An average high frequency ratio may be determined based on the high frequency ratios of the plurality of frames.

In some embodiments, the direction of the sound source may be determined based on the high frequency ratios of the sound signal by performing one or more of the following operations. The sound signal may be detected by an audio sensor. An orientation of the two audio sensors may be determined. The direction of the sound source may be determined based on the orientation of the two audio sensors.

In some embodiments, the direction of the sound source may be determined based on whether a difference of the high frequency ratios of the sound signals is higher than a threshold. If the difference of the high frequency ratios of the sound signal is higher than the threshold, then setting the direction of the sound source as a same direction of the orientation of the two audio sensors.

In some embodiments, the direction of the sound source may be determined based on whether a difference of the high frequency ratios of the sound signals is lower than a threshold. If the difference of the high frequency ratios of the sound signal is lower than the threshold, then setting the direction of the sound source as an opposite direction of the orientation of the two audio sensors.

In some embodiments, the locating of the sound source may be determined by performing one or more of the following operations. An image relating to the sound source may be determined. The sound making behavior may be determined based on the image and the sound.

In some embodiments, the image relating to the sound source may include a video relating to the sound source within a time period of before and after the sound making behavior occurs.

In some embodiments, the sound making behavior may include a honking behavior of a vehicle driver.

In some embodiments, the sound signal may be recognized based on a feature of the sound. The feature of the sound includes at least one of a frequency feature, a wave shape feature, a sound volume feature, a time feature, or a voiceprint feature.

In some embodiments, the sound may be recognized by performing one or more of the following operations. A voiceprint feature of the sound signal may be determined. A voiceprint feature associated with a known sound may be obtained. The voiceprint feature of the sound signal may be compared with the voiceprint feature associated with the known sound Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
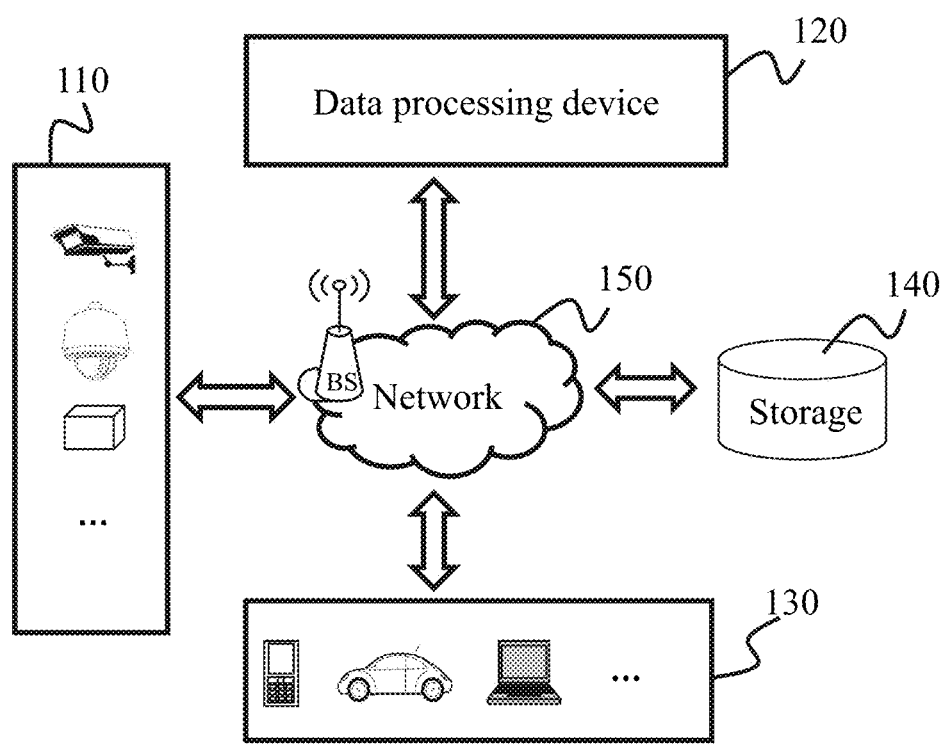
FIG. 1 illustrates a schematic diagram of an exemplary monitoring system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure provided herein relates to relates to monitoring system. Specially, the present disclosure relates to a sound source locating system and method in monitoring system. According to some embodiments of the present disclosure, the method may include detecting sound signals of a sound corresponding to a sound source. The method may further include recognizing the sound based on the sound signals. The method may further include locating the sound source based on a result of the recognition. The method may further include obtaining an image data of the sound source. The obtaining the image data of the sound source further may include determining a sound making behavior based on the image data.

FIG. 1 illustrates a schematic diagram of an exemplary monitoring system according to some embodiments of the present disclosure. Monitoring system 100 may include a monitoring device 110, a data processing device 120, a terminal 130, a storage 140, and a network 150.

Monitoring device 110 may be configured to monitor one or more objects. The one or more objects may be static or moving. Monitoring device 110 may include a camera. The camera may be configured to capture an image of the one or more objects. The image may include a still picture, a motion picture, a video (offline or live streaming), a frame of a video, or a combination thereof. The camera may be a network camera, a fixed camera, a fixed dome camera, a covert camera, a Pan-Tilt-Zoom (PTZ) camera, and/or a thermal camera.

In some embodiments, monitoring device 110 may include one or more audio sensors, one or more light sensors, or the like, or a combination thereof. The audio sensor(s) may be configured to obtain a sound signal generated from the one or more objects. In some embodiments, the audio sensor(s) may be sensitive to a particular frequency (such as 85 Hz-1100 Hz, 450 Hz-500 Hz, etc.). In some embodiments, the audio sensors may be dynamic audio sensors, condenser audio sensors, ribbon audio sensors, Micro-Electro-Mechanical System (MEMS) audio sensors, and carbon audio sensors, or the like, or a combination thereof. A number of the audio sensors may be any integer (such as 1, 4, 8, 7, 10, and 20, etc.). The audio sensors may be arranged on monitoring device 110 (or on a camera thereof) with any configuration. For example, the camera may have two audio sensors, and the two audio sensors may be arranged on opposite sides of the ball camera. As another example, the camera may include four audio sensors, and the four audio sensors may be arranged on four vertexes of a rectangle on the camera.

In some embodiments, the light sensor may be configured to obtain a light signal emitted the one or more objects. The sound signal and the light signal may be configured to locate the one or more objects.

Data obtained by monitoring device 110 (e.g., images, sound signals, and light signals) may be stored in storage 150, sent to data processing device 120 or terminal(s) 130 via network 160.

Data processing device 120 may be configured to process data. The data may be an image, a sound signal and/or a light signal. The data may be obtained by monitoring device 110 or retrieved form another source (e.g., storage 150, etc.). For example, the data may be more than one images obtained by a camera of monitoring device 110. Data processing device 120 may also be configured to, based on the data, recognize a sound, locate a sound source, detect a face, recognize a license plate, determine a vehicle flow, determine a behavior, detect an intrusion, or the like, or a combination thereof.

Data processing device 120 may further be configured to generate a control signal. The control signal may be generated based on a behavior feature of an object, a position of a sound source, a vehicle license plate recognition result, or the like, or a combination. The control signal may be used to control monitoring device 110. For example, data processing device 120 may generate a control signal to make a camera of monitoring device 110 to track an object and obtain an image of the object. As another example, data processing device 120 may generate a control signal to activate an alarm device or transmit an alert to a remote device (not shown in FIG. 1) when there is a speeding vehicle.

Data processing device 120 may be a device that may process data. For example, data processing device 120 may include a high-performance computer specialized in image processing or transaction processing, a personal computer, a portable device, a server, a microprocessor, an integrated chip, a digital signal processor (DSP), a pad, a PDA, or the like, or a combination thereof. In some embodiments, data processing device 120 may be implemented on computing device 200 shown in FIG. 2.

Terminal 130 may be connected to or communicate with data processing device 120. Terminal 130 may allow one or more operators (e.g., a law enforcement officer, etc.) to control the production and/or display of the data (e.g., the image captured by monitoring device 110) on a display. Terminal 130 may include an input device, an output device, a control panel, a display (not shown in FIG. 1), or the like, or a combination thereof.

An input device may be a keyboard, a touch screen, a mouse, a remote controller, a wearable device, or the like, or a combination thereof. The input device may include alphanumeric and other keys that may be inputted via a keyboard, a touch screen (e.g., with haptics or tactile feedback, etc.), a speech input, an eye tracking input, a brain monitoring system, or any other comparable input mechanism. The input information received through the input device may be communicated to data processing device 120 via network 160 for further processing. Another type of the input device may include a cursor control device, such as a mouse, a trackball, or cursor direction keys to communicate direction information and command selections to, for example, data processing device 120 and to control cursor movement on display or another display device.

A display may be configured to display the data received (e.g., the image captured by monitoring device 110). The information may include data before and/or after data processing, a request for input or parameter relating to image acquisition and/or processing, or the like, or a combination thereof. The display may include a liquid crystal display (LCD), a light emitting diode (LED)-based display, a flat panel display or curved screen (or television), a cathode ray tube (CRT), or the like, or a combination thereof.

Storage 150 may store data and/or relevant information or parameters. The data may include an image (e.g., an image obtained by a camera), a sound signal and/or a light signal. The parameters may include an intrinsic parameter and/or an extrinsic parameter. The intrinsic parameter may be a parameter of the one or more cameras of monitoring device 110 including, for example, a focal length and/or a lens distortion parameter, or a combination thereof. The extrinsic parameter may be a pose and/or a position parameter of the one or more cameras of monitoring device 110 including, for example, a pitch angle, a roll angle, a yaw angle, and/or a height, or a combination thereof.

Network 160 may facilitate communications between various components of monitoring system 100. Network 160 may be a single network, or a combination of various networks. Network 160 may be a wired network or a wireless network. The wired network may include using a Local Area Network (LAN), a Wide Area Network (WAN), a Bluetooth, a ZigBee, a Near Field Communication (NFC), or the like, or a combination thereof. The wireless network may be a Bluetooth, a Near Field Communication (NFC), a wireless local area network (WLAN), Wi-Fi, a Wireless Wide Area Network (WWAN), or the like, or a combination thereof.

It should be noted that the descriptions above in relation to monitoring system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, part or all of the image data generated by monitoring device 110 may be processed by terminal 130. In some embodiments, monitoring device 110 and data processing device 120 may be implemented in one single device configured to perform the functions of monitoring device 110 and data processing device 120 described in this disclosure. In some embodiments, terminal 130 and display 140 may be combined with or part of data processing device 120 as a single device. Similar modifications should fall within the scope of the present disclosure.

Figure 2:
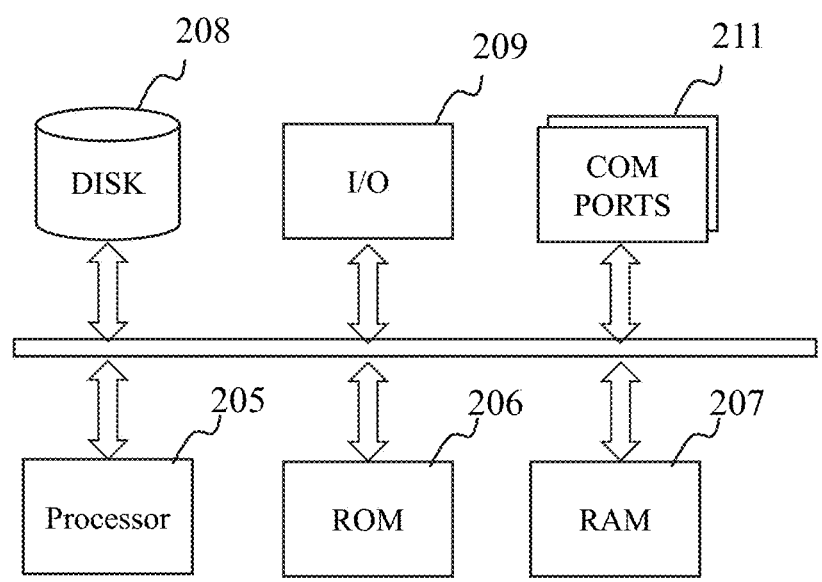
FIG. 2 illustrates an architecture of an exemplary computing device according to some embodiments of the present disclosure.

FIG. 2 illustrates an architecture of an exemplary computer on which a specialized system incorporating the present teaching may be implemented. Such a specialized system incorporating the present teaching has a functional block diagram illustration of a hardware platform that may include user interface elements. Computing device 200 may be a general-purpose computer or a special purpose computer. Computing device 200 may be used to implement any component of image processing as described herein. For example, data processing device 120 may be implemented on a computer such as computing device 200, via its hardware, software program, firmware, or a combination thereof. Although only one such computer is shown, for convenience, the computer functions relating to image processing as described herein may be implemented in a distributed fashion on a number of similar platforms, to distribute the processing load.

Computing device 200, for example, may include communication (COM) ports 211 connected to and from a network connected thereto to facilitate data communications. Computing device 200 may also include a processor 205, in the form of one or more processors, for executing program instructions stored in a storage device (e.g., disk 208, read only memory (ROM) 206, or random access memory (RAM) 207)), and when executing the program instructions, processor 205 may be configured to cause computing device 200 to perform the functions thereof described herein.

The exemplary computer platform may include an internal communication bus 204, program storage, and data storage of different forms, e.g., disk 208, ROM 206, or RAM 207, for various data files to be processed and/or communicated by the computer, as well as possibly program instructions to be executed by processor 205. Computing device 200 may also include an I/O component 209, supporting input/output flows between the computer and other components therein such as user interface elements (not shown in FIG. 2). Computing device 200 may also receive programming and data via network communications.

Aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution—e.g., an installation on an existing server. In addition, image processing as disclosed herein may be implemented as a firmware, firmware/software combination, firmware/hardware combination, or a hardware/firmware/software combination.

Figure 3:
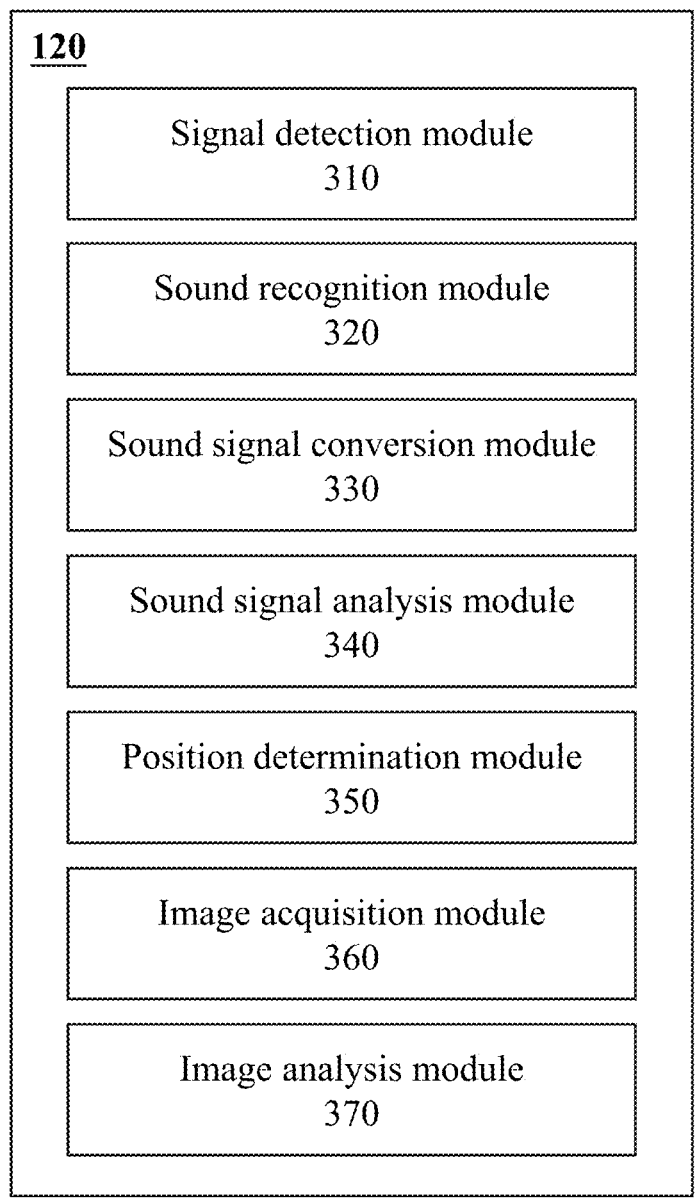
FIG. 3 illustrates an exemplary data processing device according to some embodiments of the present disclosure.

FIG. 3 illustrates an exemplary data processing device 120 according to some embodiments of the present disclosure. Data processing device 120 may include a signal detection module 310, a sound recognition module 320, a sound signal conversion module 330, a sound signal analysis module 340, a position determination module 350, an image acquisition module 360, and an image analysis module 370. Components in data processing device 120 may be connected to or communicate with each other and/or other components in monitoring system 100 including, for example, monitoring device 110, terminal 130, database 140, or the like, or a combination thereof.

Generally, the words "module," "unit," or "sub-unit," as used herein, refers to logic embodied in hardware or firmware, or to a collection of software instructions. The modules described herein may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices (e.g., processor 205 illustrated in FIG. 2) can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules can be included of connected logic units, such as gates and flip-flops, and/or can be included of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

Signal detection module 310 may configured to detect a sound signal. The sound signal may be a representation of sound (e.g., a honking of a vehicle, a voice of people, and an explosive sound, etc.). The sound signal may be in a type of an electrical voltage or an electrical current. The sound signal may be a digital signal or an analog signal.

In some embodiments, signal detection module 310 may be implemented on monitoring device 110. Signal detection module 310 may include one or more audio sensors configured to acquire the sound signal. The audio sensor may be a dynamic audio sensor, a condenser audio sensor, a ribbon audio sensor, a Micro-Electro-Mechanical System (MEMS) audio sensor, and a carbon audio sensor, or the like, or a combination thereof. In some embodiments, the audio sensor may include an omni-directional microphone, a unidirectional microphone, a bidirectional microphone, and a cardioid microphone, or the like, or a combination thereof. In some embodiments, the audio sensor may be sensitive to a particular frequency (such as 85 Hz-1100 Hz, 450 Hz-500 Hz, etc.). The one or more audio sensors may be arranged in any configuration. For example, monitoring device 110 may include two audio sensors, and the two audio sensors may be arranged on two different sides of a camera of monitoring device 110. As another example, monitoring device 110 may include four audio sensors, and the four audio sensors may be arranged on four vertexes of a rectangle of a camera of monitoring device 110.

In some embodiments, signal detection module 310 may further include a light sensor, a heat sensor, a motion sensor, a temperature sensor, and a wind speed sensor, or the like, or a combination thereof. For example, signal detection module 310 may include four omni-directional microphones and a wind speed sensor. Signal detection module 310 may acquire a sound signal as well as detect a speed of wind near the place where signal detection module 310 is located.

Sound recognition module 320 may be configured to recognize a sound according to the acquired sound signal. The sound may be represented by the sound signal. The sound may be a honk sound from a vehicle, a sound caused by the brake of a vehicle, a voice of people, and an explosive sound, or the like, or a combination thereof. The sound may have any frequency or decibel. As used herein, the frequency of a sound may be the number of cycles of a sound wave in one second. As used herein, the decibel of a sound may be a measurement of the sound level.

A sound may be recognized according to a feature of an acquired sound signal by sound recognition module 320. The feature of the sound signal may be a frequency feature, a wave shape feature, a sound volume feature, a time feature, and a voiceprint feature, or the like, or a combination thereof.

In some embodiments, according to a feature of the acquired sound signal a sound may be determined a type (e.g., a honking of a vehicle, a voice of people, and an explosive sound, etc.). For example, a sound signal may be determined as a vehicle honking sound signal and the sound may be determined as a honking of a vehicle if the frequency of the sound signal is between 1500 HZ-3000 HZ. As another example, a sound signal may be determined as a vehicle honking sound signal if the voiceprint feature of the sound may be same to a voiceprint feature of a vehicle honking stored in a voiceprint feature sample database.

Sound recognition module 320 may use a recognition technique to recognize the sound according to the sound signal. The recognition technique may include a Hidden Markov Models (HMM) algorithm, a Dynamic Time Warping (DTW) algorithm, a neural networks algorithm (e.g., a Recurrent Neural Networks (RNNs) algorithm, a Time Delay Neural Networks (TDNNs) algorithm, etc.), a Deep Feedforward Neural Networks (DNNs) algorithm, and a voiceprint algorithm, or the like, or a combination thereof.

Sound signal conversion module 330 may be configured to convert a sound signal from time domain to frequency domain. A time domain to frequency domain conversion may be performed by sound signal conversion module 330 by a time domain to frequency domain conversion technique. The time domain to frequency domain conversion technique may include a Modified Chirp Z Transform (MCZT) algorithm, a Fourier Transform (FT) algorithm, and a Fast Fourier Transform (FFT) algorithm, or the like, or a combination thereof.

Sound signal analysis module 340 may be configured to analyze a sound signal. The operation of analysis may include determining a high frequency ratio and determining a feature of the sound signals. Sound signal analysis module 340 may use a high frequency ratio determination technique to determine a high frequency ratio. Sound signal analysis module 340 may divide a sound signal into a plurality of frames. Sound signal analysis module 340 may determine high frequency ratios of the plurality of frames. Sound signal analysis module 340 may determine an average value of the high frequency ratios of the plurality of frames.

Position determination module 350 may be configured to locate a sound source of the recognized sound or the detected sound signal. The sound source may be static or dynamic. The sound source may be a point sound source, a line sound source, or a plane sound source, or the like.

Position determination module 350 may also be configured to determine the localization of the sound source. The localization may be described in coordinates of the position of the sound source in a coordinate system, a distance from the sound source to a reference point (e.g., the location of the audio sensor(s)), an angle between a first reference line and a second reference line through the sound source, and a direction of the sound source relative to a reference direction, or the like, or a combination thereof.

In some embodiments, position determination module 350 may be configured to determine the coordinates of the sound source in a coordinate system by a coordinate determination technique. The coordinate system used by position determination module 350 may be a camera coordinate system, a world coordinate system, a retinal coordinate system, a pixel coordinate system, a two-dimensional coordinate system, a three-dimensional coordinate system, a four-dimensional coordinate system, a rectangular coordinate system, or a polar coordinate system, or the like. Position determination module 350 may determine the coordinates of the audio sensors of signal detection module 310 and reference information (e.g., wind speed, wind direction, etc.). Position determination module 350 may also determine the coordinates of the sound source based on the coordinates of the audio sensor(s), the reference information and the sound signal(s). For example, sound source may be determined at a point (200, 300) in a rectangular coordinate taking a midpoint of two audio sensors as the origin point.

In some embodiments, position determination module 350 may be configured to determine a distance from the sound source to a reference point according to a distance determination technique. The reference point may be a midpoint of a line segment of two audio sensors of signal detection module 310, a geometrical center of one of the audio sensors of signal detection module 310, a fixed point of a ball camera on which the audio sensors installed. For another example, the sound source may be determined in a distance of 100 meters from a midpoint of a line of two audio sensors.

In some embodiments, position determination module 350 may be configured to determine a direction of the sound source relative to a reference direction based on a direction determination technique. The reference direction may be an orientation of the audio sensors. For example, the direction of the sound source may be a direction that is the same with an orientation of audio sensor(s) or opposite with the orientation of the audio sensors. As used herein, the orientation of the audio sensor(s) may be a direction of which the audio sensor(s) may be set initial (a facing direction of the audio sensor). More detail descriptions about the orientation of the audio sensors may be found in FIG. 11 and relevant portions of the disclosure.

The direction determination technique may include one or more operations performed by position determination module 350. Position determination module 350 may obtain a sound signal in time domain detected by each of two or more audio sensors. Position determination module 350 may also convert the sound signals from time domain to frequency domain. Position determination module 350 may also determine high frequency ratio of sound signals in frequency domain. As used herein, a high frequency ratio may refer to a ratio between a high frequency component of a sound signal and the sound signal. Position determination module 350 may also determine the direction of sound source based on high frequency ration of sound signals form two or more audio sensors of signal detection module 310. For example, the sound source may be determined in the same direction of the orientation of the audio sensors of signal detection module 310.

In some embodiments, position determination module 350 may be configured to determine an angle between a first reference line and a second reference line through the sound source by an angle determination technique. The first reference line may be a baseline of two audio sensors of signal detection module 310. The second reference may be a line determined by the sound source and one of the audio sensor of the signal detection module 310. For example, the sound source may be determined in an angle of 10° from a particular direction (e.g., north, south, and east, etc.) in a world coordinate system.

In some embodiments, localization of the sound source may be described in terms of three-dimensional position: the azimuth or horizontal angle, the elevation or vertical angle, and the distance (for a static sound source) or velocity (for a moving sound source).

Image acquisition module 360 may acquire an image. The image may be a photo or a video, or the like, or a combination thereof. The image may be acquired by monitoring device 110, or retrieved from another source (e.g., database 140, a storage, etc.).

Image acquisition module 360 may include one or more cameras. The camera may be a gun camera, a ball camera, and a hall-ball camera, or the like, or a combination thereof. The one or more cameras may obtain image(s) all the time, at a particular time (e.g., at 10:00 AM, at 11:00 AM, and at 12:00 AM, etc.), with a trigger condition (e.g., recognizing a vehicle honking, etc.), or with a time interval (e.g., every ten minutes, etc.), or the like, or a combination thereof.

Image acquisition module 360 may acquire an image when sound recognition module 320 recognizing a particular sound (e.g., a vehicle honking, etc.), and position determination module 350 determine a position of the sound source of the sound. Image acquisition module 360 may acquire the image of the sound source based on the position information of the sound source.

In some embodiments, two or more audio sensors of signal detection module 310 may be installed on a ball camera of monitoring device 110. The two or more audio sensors may be configured to detected sound signals from the same sound source. Position determination module 350 may determine a position information of the sound source based on the detected sound signals. Based on the position information of the sound source, monitoring system 100 may determine an angle to rotate of the ball camera and take images of the sound source.

Image analysis module 370 may be configured to analyze the image. The image may be obtained by image acquisition module 360 or retrieved from other sources (e.g., a storage 140, a database, etc.). Operation of image analysis may include intrusion detection, face detection, behavior analysis, vehicle license plate recognition, and vehicle flow statistics, or the like, or a combination thereof.

It should be noted that the descriptions above in relation to data processing device 120 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, part or all of the data acquired by data processing device 120 may be processed by terminal 130. As another example, there may be an alarm module (not shown in FIG. 3) and the alarm module may give an alarm when there is a vehicle honking. For example, sound signal conversion module 330 may be omitted, and sound signal analysis module 340 may perform a time to frequency domain conversion. As another example, sound signal analysis may be based on sound signals in time domain, then sound signal conversion module 330 may be omitted. Similar modifications should fall within the scope of the present disclosure.

Figure 4:
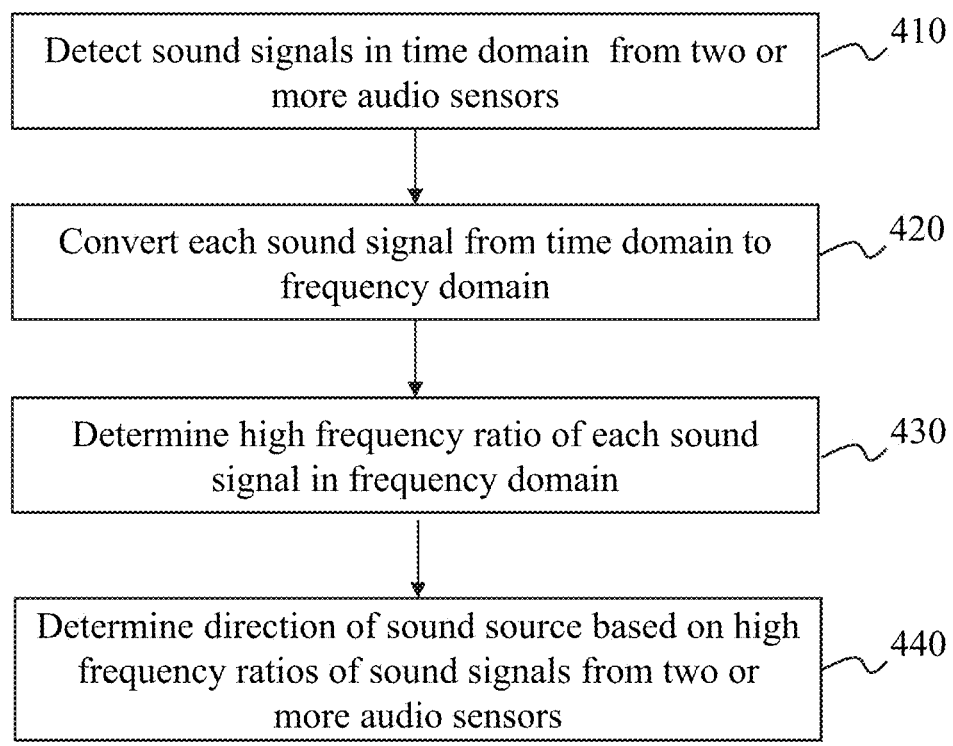
FIG. 4 is a flowchart illustrating an exemplary process for locating a sound source according to some embodiments of the present disclosure.

FIG. 4 is a flowchart illustrating an exemplary process for locating a sound source of a detected sound signal in accordance with some embodiments of the present disclosure. Process 400 may be performed by the data processing device 120.

In 410, sound signal(s) in time domain from two or more audio sensors may be detected. The detection of the sound signal may be performed by signal detection module 310.

In some embodiments, a sound signal may be acquired by each of two or more audio sensors of signal detection module 310. The two or more audio sensors may dependent or independent. The features (e.g., dynamic range, sensitivity, and frequency response, etc.) of the two or more audio sensors may be same or different. In some embodiments, the two or more audio sensors may be independent and with same features.

In some embodiments, more than one audio sensors with same features may be installed on a head of a ball camera (i.e., part of monitoring device 110). The head may support the camera and move together with the camera. Distance between each two audio sensors may be a distance. In some embodiments, the distance may be smaller than the diameter of the ball camera. Alternatively or additionally, the distance may be larger than a radius of the ball camera. The audio sensors may separately detect a sound signal sound from a same sound source. Merely by way of example, the audio sensors may be omnidirectional microphones.

In some embodiments, signal detection module 310 may optionally reduce noise (e.g., a sound of wind, an environment noise, and/or a background noise from the sound signal). Process 400 may further include an operation of noise reduction. The noise reduction may be performed according to a dynamic noise limiter (DNL) algorithm, a dynamic noise reduction (DNR) algorithm, or time-frequency filters, or the like, or a combination thereof.

In 420, each of the sound signals may be converted from time domain to frequency domain. The conversion of the sound signal from time domain to frequency domain may be performed by sound signal conversion module 330. A time to frequency transform technique may be used in 420. In some embodiments, the time to frequency transform technique may be a Modified Chirp Z Transform (MCZT) algorithm, a Fourier Transform (FT) algorithm, and a Fast Fourier Transform (FFT) algorithm, or the like, or a combination thereof.

In 430, a high frequency ratio of each of the sound signals in frequency domain may be determined. The determination of high frequency ratio of each of the sound signals may be performed by sound signal analysis module 340. In some embodiments, a sound signal in frequency domain may be divided into a plurality of frames. The high frequency ratio of the sound signal may be determined based on the high frequency ratio of the plurality of frames. For example, the high frequency ratio of the sound signal may be an average value of the high frequency ratios of the plurality of frames.

In 440, a direction of a sound source corresponding to the detected sound signal may be determined based on the high frequency ratios of the sound signals from the two or more audio sensors. The determination of the direction of the sound source may be performed by position determination module 350.

Sound signal may attenuate in a process of transmission where there is an obstruction. A ball camera on which the two or more audio sensors of signal detection module 310 installed may be an obstruction in the process of transmission of a sound. Attenuation of the sound signals may be different because the positions of the audio sensors of signal detection module 310 with respect to the sound source may be different. Because of the attenuation, the sound signal detected by each of the audio sensors may be different, and their high frequency ratios of the detected sound signal also may be different. A direction of the sound source of the detected sound signal may be determined based on the high frequency ratios of the sound signals from the two or more audio sensors. The direction may be described as in a same direction of the orientation of the audio sensors or in an opposite direction of an orientation of the audio sensors.

Figure 11:
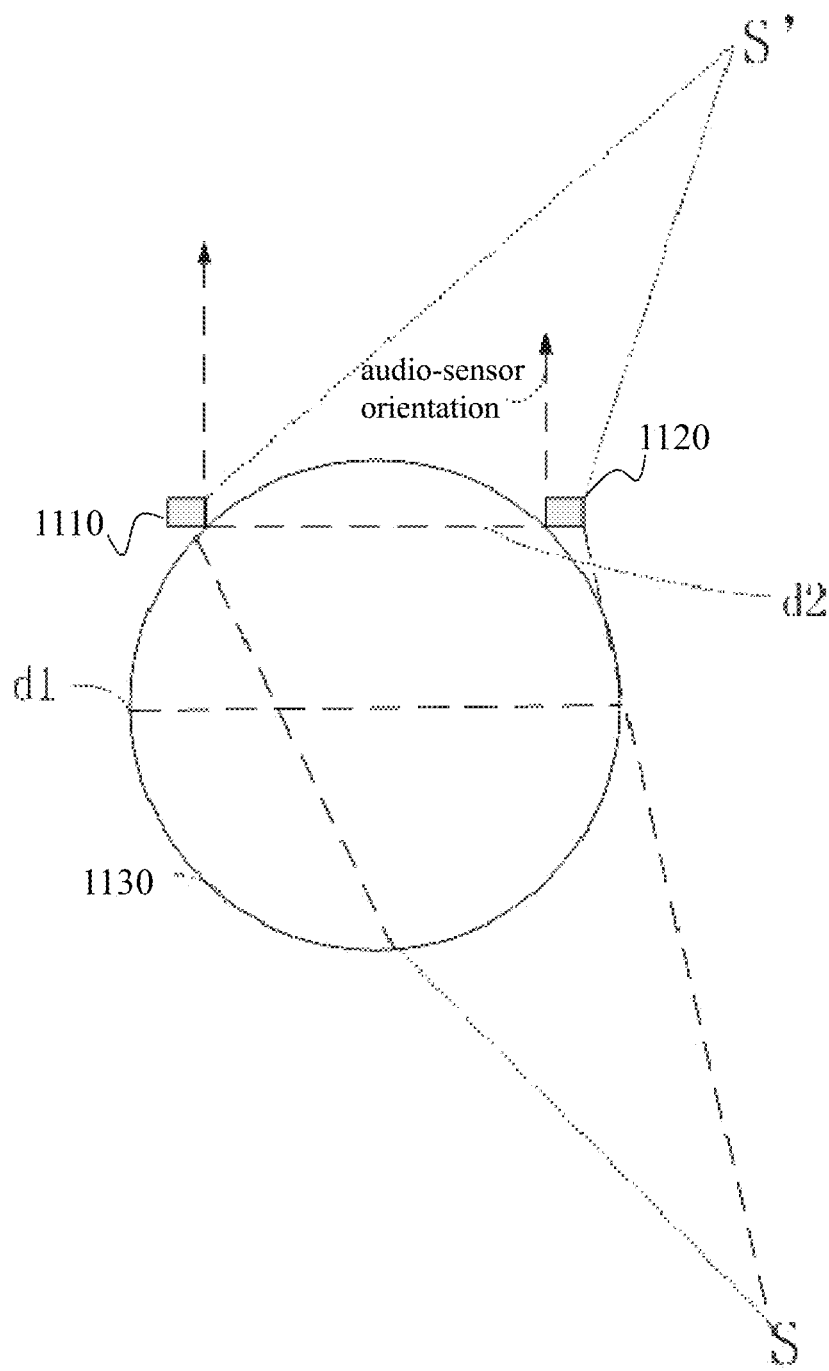
FIG. 11 illustrates a schematic diagram of an exemplary camera according to some embodiments of the present disclosure.

In some embodiments, an orientation of the audio sensors may be defined as a direction that is perpendicular to a line segment joined two audio sensors and departed from a diameter of a ball camera. Merely by way of example, FIG. 11 illustrates a schematic diagram of an exemplary camera according to some embodiments of the present disclosure. As shown in FIG. 11, line segment d1 may refer to a diameter of the ball camera. Line segment d2 may join the two audio sensors on a straight line. Line segment d1 may be parallel to line segment d2. In some embodiments, an orientation of the audio sensors may be defined as a direction that is perpendicular to line segment d2 and departs from line segment d1. In some embodiments, the orientation of the audio sensors may be defined as a direction that is perpendicular to line segment d2 and departs from line segment d2. In some embodiments, an orientation of the audio sensors may be defined as a direction that is perpendicular to line segment d2 and directs to line segment d2. In some embodiments, if a difference of the high frequency ratios of the sound signals equals to or greater than a threshold, the direction of the sound source of the detected sound signal may be determined in the same direction with the orientation of the audio sensors. If a difference of the high frequency ratios of the sound audio signals is lower than a threshold, the direction of the sound source may be determined in the opposite direction of the orientation of the audio sensors.

It should be noted that the above description is provided for the purposes of illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, the process may further include an operation between 420 and 430 for storing the obtained sound signals in frequency domain. For another example, a sound signal may be divided into plurality of frames before covering the sound signal from time domain to frequency domain in 420.

Figure 5:
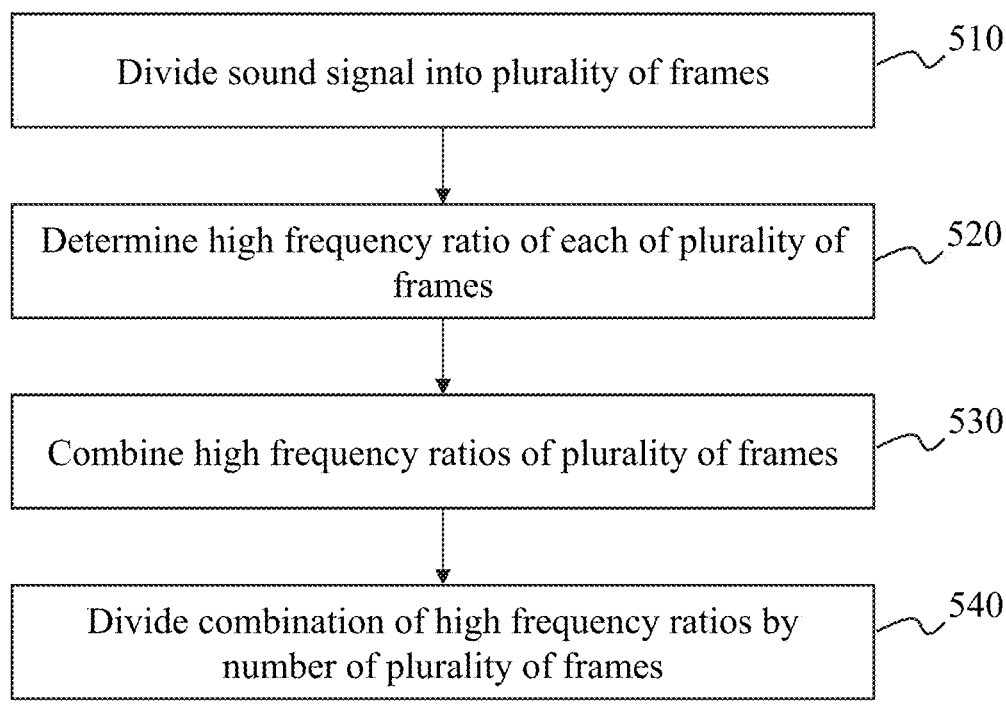
FIG. 5 is a flowchart illustrating an exemplary process for determining a high frequency ratio of a sound signal according to some embodiments of the present disclosure.

FIG. 5 is a flowchart illustrating an exemplary process for determining a high frequency ratio of a sound signal in accordance with some embodiments of the present disclosure. Process 500 may be performed by data processing device 120. In some embodiments, step 430 of process 400 may be performed based on process 500 for determining a high frequency ratio of a sound signal. The sound signal may be a sound signal in frequency domain. The operation of high frequency ratio determination may be performed by sound signal analysis module 340.

In 510, a sound signal may be divided into a plurality of frames. The plurality of frames may be overlapping frames or non-overlapping frames. As used herein, if each frame of the plurality of frames shares a first part with a previous frame and a last part with a next frame, then the plurality of frames may be overlapping frames. Length of the plurality of frames may be same or different. Merely by way of example, the length of the plurality of frames may be 20 ms. As another example, some of the plurality of frames may be 30 ms and some of the plurality of frames may be 20 ms.

One or more sound signal dividing technologies may be performed by sound signal analysis module 340 to divide the sound signals. Merely by ways of example, the sound signal dividing technologies may include a frame synchronization, a byte counting, a marking of head and tail, a delimiting of the head and the tail, or the like, or a combination thereof.

In some embodiments, the sound signal may be divide into M frames, and M may be any integer greater than 1 (such as 2, 4, 7, 8, 10, and 20, etc.). The M frames may be a continuous part of a sound signal detected by an audio sensor of signal detection module 310.

In 520, a high frequency ratio of each of the plurality of frames may be determined. The high frequency ratio of each of the plurality of frames may be determined by sound signal analysis module 340. In some embodiments, high frequency ratios of the plurality of frames may be interrelated. In some embodiments, the high frequency ratio of each of the plurality of frames may be determined separately.

In some embodiments, a high frequency ratio of each of the plurality of frames may be determined according to Equation (1) below:

$$TH_i = \frac{\sum_{i=n}^{127}[(X_{i\_real})^2 + (X_{i\_imag})^2]}{\sum_{i=0}^{127}[(X_{i\_real})^2 + (X_{i\_imag})^2]},\quad (1)$$

where $TH_i$ refers to a high frequency ratio of a frame i of a sound signal; i may be any integer greater than 0 and no greater than M; n refers to a presetting sampling point and n is an integer greater than 0; $X_{i\_real}$ refers to a real part of the frame i; $X_{i\_imag}$ refers to an imaginary part of the frame i.

In some embodiments, n may be a preset value. For example, n may be pre-set based on an empirical value. In some embodiments, n may be determined according to a particular algorithm. In some embodiments, n may be determined based on sample rates, sampling points and a reference frequency $f_{high}$. As used herein, if a frequency of sound is greater than the reference frequency, the sound may be detected by audio sensors of signal detection module 310 without attenuation. For example, n may be determined according to Equations (2) and (3) below:

$$q = \frac{256 \times f_{high}}{fs},\quad (2)$$

$$n = [q],\quad (3)$$

where $f_{high}$ refers to a reference frequency, fs refers to a sample rate, 256 refers to a sampling points, and $$f_{high} < \frac{f_s}{2}.$$

According to Equation (3), if q is an integer, then n is equal to q. If q is not an integer, then n is an integer near q (e.g., round q down or up). For example, n may equal to 6 if q is 6.4 (i.e., round q down.). As another example, n may equal to 7 if q is 6.4 (i.e., round q up.).

In some embodiments, attenuation of a sound signal may become serious when a size of an obstacle is greater than the wavelength of the sound signal. In some embodiments, a reference frequency $f_{high}$ may be determined according to Equation (4) below:

$$f_{high} = \frac{c}{d} + a,\quad (4)$$

where c is velocity of sound in air (e.g., 340 m/s, etc.), d refers to a diameter of a ball camera, and a is a presetting constant (e.g., 200 Hz, etc.).

In 530, the high frequency ratios of the plurality of frames may be combined. The operation of combination may be determined a sum of the high frequency ratios of the plurality of frames. The combination of the high frequency ratios may be donated as N.

In 540, the combination of the high frequency ratios of the frames may be divided by a number of the plurality of frames. Therefor an average value of the high frequency ratios of the plurality of frames may be determined. The average value of N may be determined in accordance with one or more averaging algorithms. Merely by ways of example, the averaging algorithm may include arithmetic mean, geometric mean, quadratic mean, cubic mean, generalized mean, weighted mean, or the like, or any combination thereof.

Figure 6:
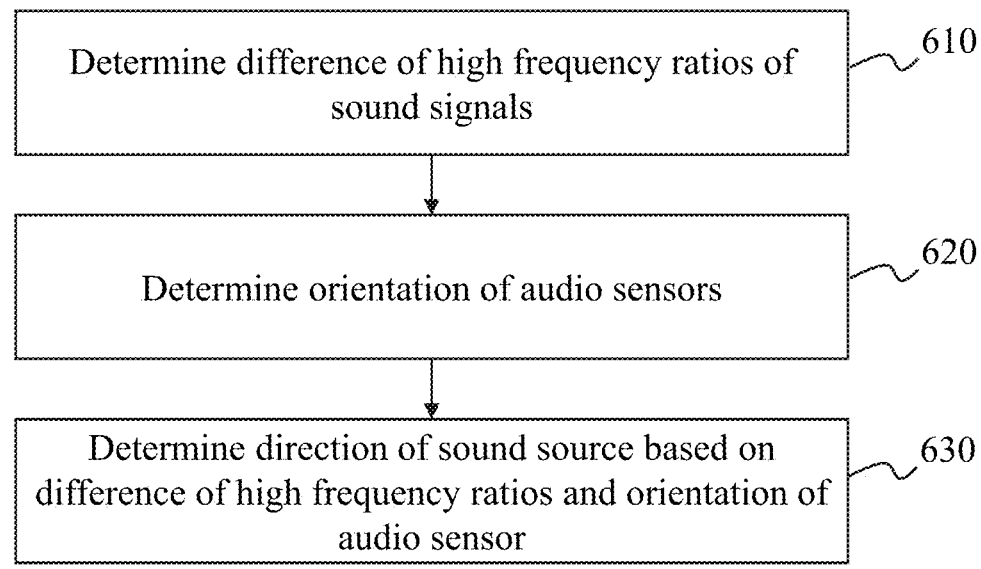
FIG. 6 is a flowchart illustrating an exemplary process for determining a position of a sound source according to some embodiments of the present disclosure.

FIG. 6 is a flowchart illustrating an exemplary process for determining a position of a sound source in accordance with some embodiments of the present disclosure. Process 600 may be performed by position determination module 350. In some embodiments, step 440 of process 400 may be performed based on process 600.

Figure 12:
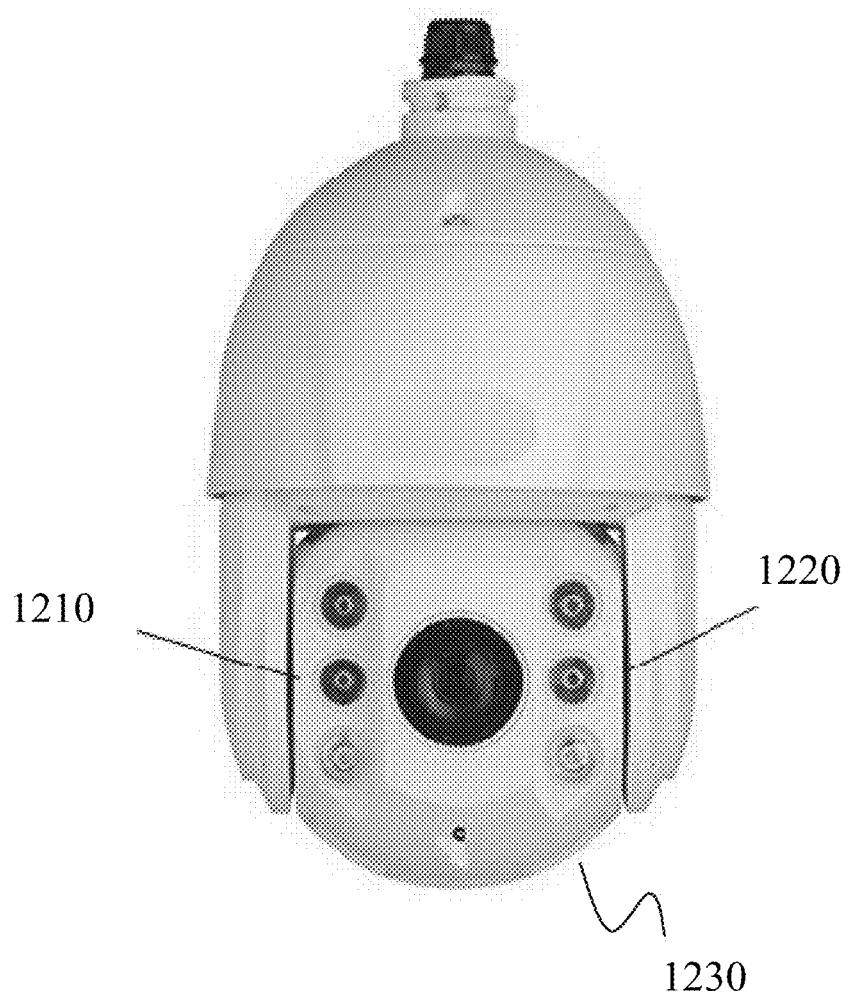
FIG. 12 illustrates a schematic diagram an exemplary camera according to some embodiments of the present disclosure.

In 610, a difference between high frequency ratios of more than one sound signals may be determined. Merely by way of example, a sound signal may be detected by each of two audio sensors of signal detection module 310 installed on a ball camera. The two audio sensors may include a first audio sensor and a second audio sensor. A distance between the first audio sensor and the second audio sensor may be smaller than the diameter of the ball camera and no smaller than the radius of the ball camera. The first audio sensor, the second audio and a lens of the ball camera may be in a same side of the ball camera as shown in FIG. 12.

In some embodiments, a first audio sensor may detect a first sound signal and a second audio sensor may detect a second sound signal. A first high frequency ratio may be determined according to the first sound signal, and a second high frequency ratio may be determined according to the second sound signal.

In 620, an orientation of the audio sensors may be determined. In some embodiments, two audio sensors may be installed on a ball camera as shown in FIG. 11 and FIG. 12. An orientation of the audio sensors may be determined based on position of the audio sensors on the ball camera.

In 630, the direction of the sound source may be determined based on the difference of the high frequency ratios and the orientation of the audio sensors.

The direction of the sound source may be determined based on a comparison between the difference of the high frequency ratios and a threshold. In some embodiments, an absolute value of the difference may be determined, and the direction of the sound source may be determined based on the absolute value of the difference and a threshold.

The difference of the high frequency ratios of the audio sensors may correspond to attenuations of the high frequency ratios. In some embodiments, the attenuations of the high frequency ratios in the audio sensors may be related with the sound source. For example, the attenuations are lighter or none if the position of the sound source in the same side with the orientation of the audio sensors. For example, the attenuations are heavier if the position of the sound source in the opposite side with the orientation of the audio sensors.

In some embodiments, an existence of obstruction may affect the attenuations of the high frequency ratios. In some embodiments, the obstructions may include a substance, an infrared ray, an ultrasonic, or the like, or a combination thereof.

In some embodiments, the sound source may in a same side with the orientation of the audio sensors if an absolute value of the difference is lower than a threshold. The sound source may in an opposite direction of the orientation of the audio sensors if an absolute value of the difference is equal to or larger than the threshold.

It should be noted that the above description is provided for the purposes of illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, the process may further include an operation between 610 and 620 for determining an absolute value of the difference of the high frequency ratios of the sound signals.

Figure 7:
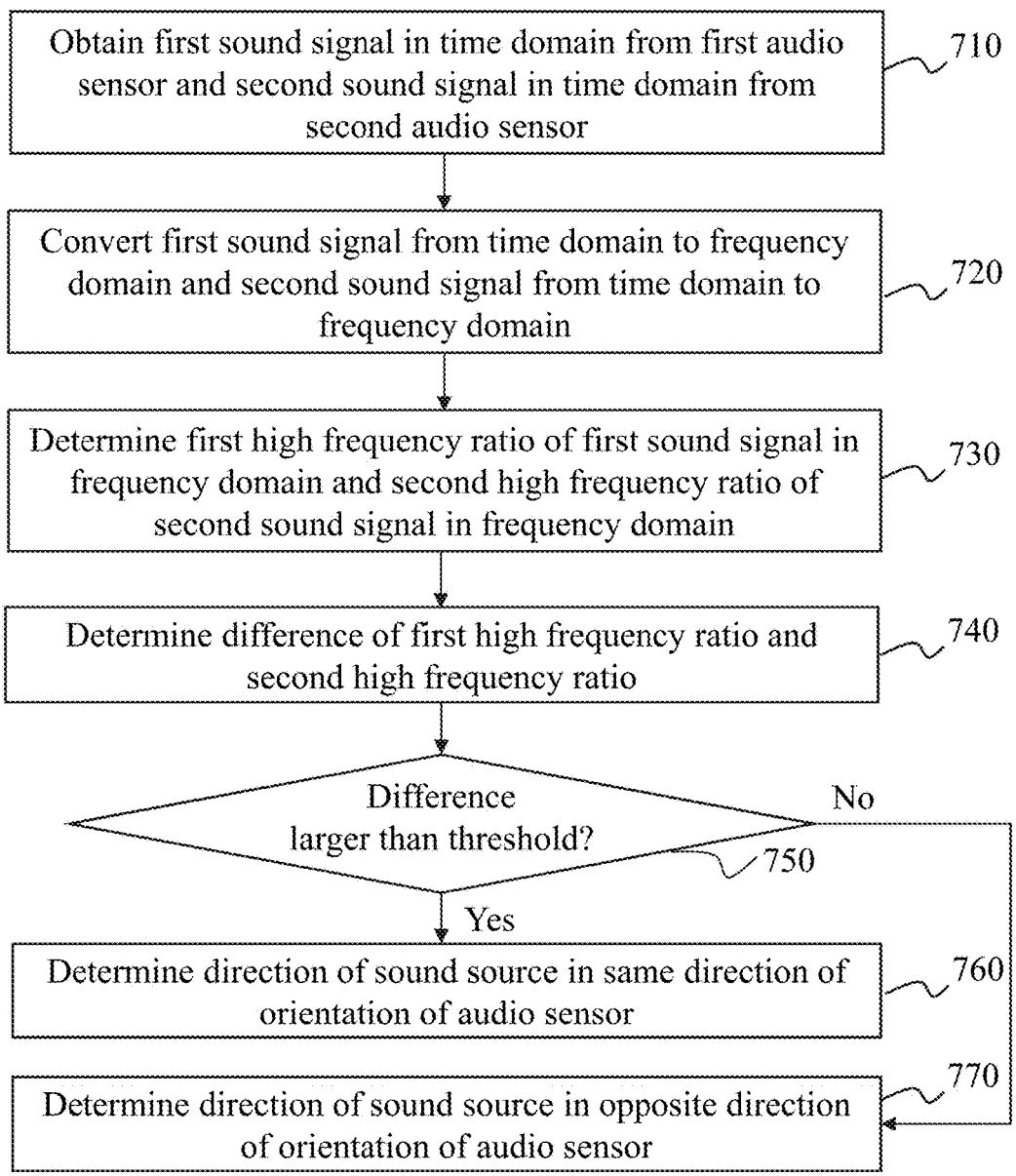
FIG. 7 is an exemplary flowchart illustrating an exemplary process for locating a sound source according to some embodiments of the present disclosure.

FIG. 7 is an exemplary flowchart illustrating a process for locating a sound source according to some embodiments of the present disclosure. Process 700 may be performed by data processing device 120. The process for locating a sound source may be determining a direction of the sound source according to a reference direction.

Merely by way of example, a first audio sensor and a second sensor may be installed on a ball camera of monitoring system 100. The distance between the two audio sensors may be larger than a radius of the ball camera and smaller than a diameter of the ball camera. As shown in FIG. 11, the orientation of the audio sensors may be a direction that is perpendicular to a line segment d2 connecting two audio sensors and departs from a diameter of a ball camera that is parallel to the line segment d2.

In 710, a first sound signal in time domain detected by the first audio sensor and a second sound signal in time domain detected by the second audio sensor may be obtained. The first sound signal and the second sound signal may correspond to a same sound. The first sound signal and the second sound signal may be detected by signal detection module 310.

In 720, the first sound signal and the second sound signal may be converted from time domain to frequency domain. The conversion may be processed by sound signal conversion module 330.

In 730, a first high frequency ratio of the first sound signal in frequency domain and a second high frequency ratio of the second sound signal in frequency domain may be determined. The determination of the high frequency ratios may be performed by sound signal analysis module 340.

In 740, a difference of the first high frequency ratio and the second high frequency ratio may be determined. The determination of the difference of the high frequency ratios may be performed by sound signal analysis module 340.

In 750, the difference of the first high frequency ratio and the second high frequency ratio may be compared with a threshold. If the difference is equal to or larger than the threshold, then process 700 may proceed to 760. On the other hand, if the difference is lower than the threshold, process 710 may process to 770.

In 760, the direction of the sound source may be determined as in a same direction of the orientation of the two audio sensors.

In 770, the direction of the sound source may be determined as in an opposite direction of the orientation of the two audio sensors.

It should be noted that the flowchart of performing the location described above is provided for the purposes of illustration, and not intended to limit the scope of the present disclosure. For persons having ordinary skills in the art, various variations and modifications may be conduct under the teaching of the present disclosure. For example, there may be one more operation in 710 and 720 to determine a type (e.g., a car honking, etc.) or a feature (e.g., a frequency feature, etc.) of the sound signal. If the sound signal is satisfied to a condition (e.g., the sound signal is a car honking, the frequency of the sound signal is larger than 1000 Hz, etc.) then 720 may be performed, otherwise some other sound signals may be detected. However, those variations and modifications may not depart from the protecting of the present disclosure.

Figure 8:
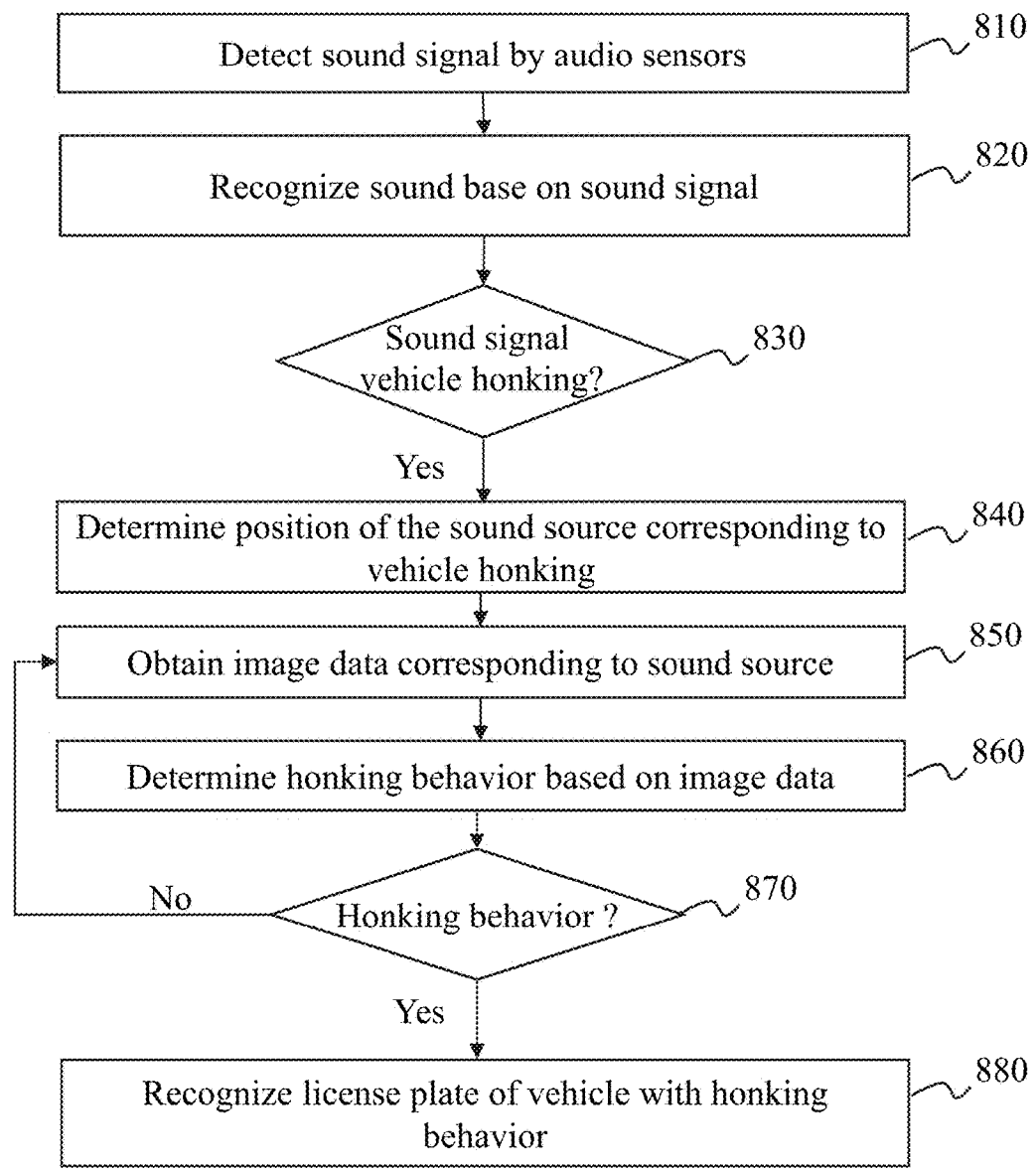
FIG. 8 is an exemplary flowchart illustrating an exemplary process for monitoring a sound source according to some embodiments of the present disclosure.

FIG. 8 is an exemplary flowchart illustrating a process for monitoring a sound source according to some embodiments of the present disclosure. The operation of sound source monitoring may be performed by monitoring system 100.

In 810, sound signals may be detected by audio sensors of signal detection module 310. Merely by way of example, a sound signal of a sound may be detected by each of a plurality of audio sensors of signal detection module 310. In some embodiments, the plurality of audio sensors may include four audio sensors. The four audio sensors may be four microphones in an array.

In 820, the sound corresponding to the sound signals detected by the plurality of audio sensors may be recognized. In some embodiments, the type of the sound may also be determined. The recognition of the sound and/or determination of the type of the sound and/or determination of the type of the sound may be performed by sound recognition module 320. Detailed description of the recognition of the sound and determination of the type of the sound may be found elsewhere in this disclosure.

In 830, whether the sound is a vehicle honking may be determined. If the sound is a vehicle honking, process 800 may proceed to 840. On the other hand, if the sound is not a vehicle honking, process 800 may proceed to 810 and may continue to detect a sound signal.

In step 840, a position of the sound source corresponding to the vehicle honking would be determined. In some embodiments, the operation of determining the position of the sound source corresponding to the vehicle honking may be performed based on process 400 or 1000. In some embodiments, coordinates of the sound source corresponding to the vehicle honking would be determined in a world coordinate system.

In step 850, an image corresponding to the sound signal may be captured and/or obtained by, for example, the camera of monitoring device 110. The information relating to the image and/or sound source may also be obtained, including, for example, the position of the sound source of the vehicle honking and the time of the vehicle honking occurs. In some embodiments, the image captured may include a video. The video may cover a certain time period before and after the honking occurs. Merely by way of example, the video may cover the time period 30 seconds before and after the honking occurs.

In 860, a honking behavior may be determined based on the image. Determination of the honking behavior may be performed by image analysis module 370. Image analysis module 370 may use a behavior analysis technique to determine a honking behavior. Image analysis module 370 may determine coordinates of sound source (e.g., a honking vehicle, etc.) in pixel coordinate system. Image analysis module 370 may determine the honking behavior based on the coordinates of sound source in pixel coordinate system and the image data.

In some embodiments, coordinates of sound source in pixel coordinate system may be determined based on a virtual camera view and a virtual position of the sound source. The virtual camera view may be determined based on the position of a lens of the camera and the lens angle information. The virtual position of the sound source may be determined based on the coordinates of sound source in the world coordinate system and relative position of the audio sensors and the camera.

In 870, a candidate of the honking behavior may be determined based on the image. For example, whether a driver in the image indeed pushed the honk may be determined according to the analysis of the image. If the analysis of the image satisfies the honking behavior, process 800 may proceed to 880. If not, process 800 may proceed to 850.

In 880, the license plate of the vehicle corresponding to the honk may be recognized. The information relating to the recognized license plate may be uploaded to database 140 via network 150. In some embodiments, the information relating to the license plate may be reported to a traffic law enforcement department, an alarm center, etc., via, for example, network 150.

It should be noted that the flowchart of performing the location described above is provided for the purposes of illustration, and not intended to limit the scope of the present disclosure. For persons having ordinary skills in the art, various variations and modifications may be conduct under the teaching of the present disclosure. For example, step 820 and 830 may be skipped. After detected a sound signal, a sound source locating operation may be performed to locate the sound source of the sound signal. However, those variations and modifications may not depart from the protecting of the present disclosure.

Figure 9:
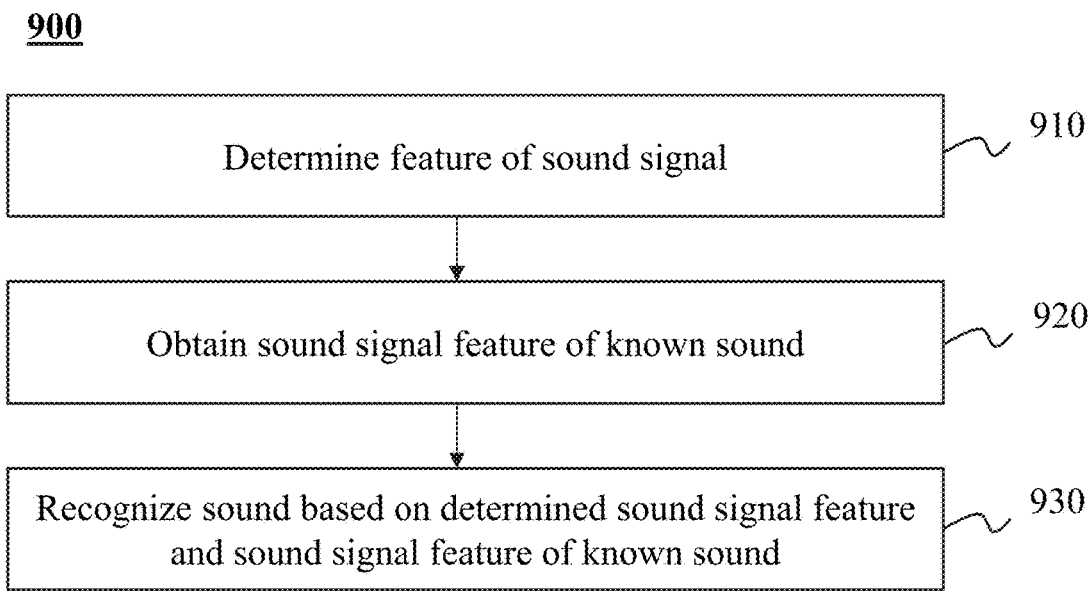
FIG. 9 is a flowchart illustrating an exemplary process for recognizing a sound according to some embodiments of the present disclosure.

FIG. 9 is a flowchart illustrating an exemplary process for recognizing a sound based on a detected sound signal in accordance with some embodiments of the present disclosure. Process 900 may be performed by the sound recognition module 320. In some embodiments, step 820 of process 800 may be performed based on process 900 for recognizing a sound based on a sound signal.

In 910, a feature of a sound signal may be determined. The feature of the sound signal may be a frequency feature, a wave shape feature, a sound volume feature, a time feature, and a voiceprint feature, or the like, or a combination thereof. In some embodiments, the feature of the sound signal may be extracted from the sound signal.

In 920, a sound signal feature of a known sound may be obtained. In some embodiments, the data relating to a known sound (e.g., a honk sound) including the sound signal feature may be stored in a sound signal feature database. In some embodiments, the data relating to a known sound may be generated by data processing device 120 or retrieved from another source (e.g., storage 150, a database, etc.).

In some embodiments, a sound signal feature database may be a voiceprint feature database. The voiceprint feature database may include a plurality of vehicle honking sounds, the types of the plurality of vehicle honking sound (e.g., car honking, motorcycle honking, etc.), and their corresponding voiceprint features. The voiceprint feature database may be generated by data processing device 120 or retrieved from other sources (e.g., a storage 140, a database, etc.).

In 930, a sound may be recognized based on the determined sound signal feature and the sound signal feature of the known sound. In some embodiments, sound recognition module 320 may compare the voiceprint of the sound to be recognized and the voiceprint feature of the known sound (or sound signal). If the similarity between two voiceprint features is equal to or exceeds a threshold, the sound to be recognized may be determined as having the same type of the known sound (e.g., a car honking).

Figure 10:
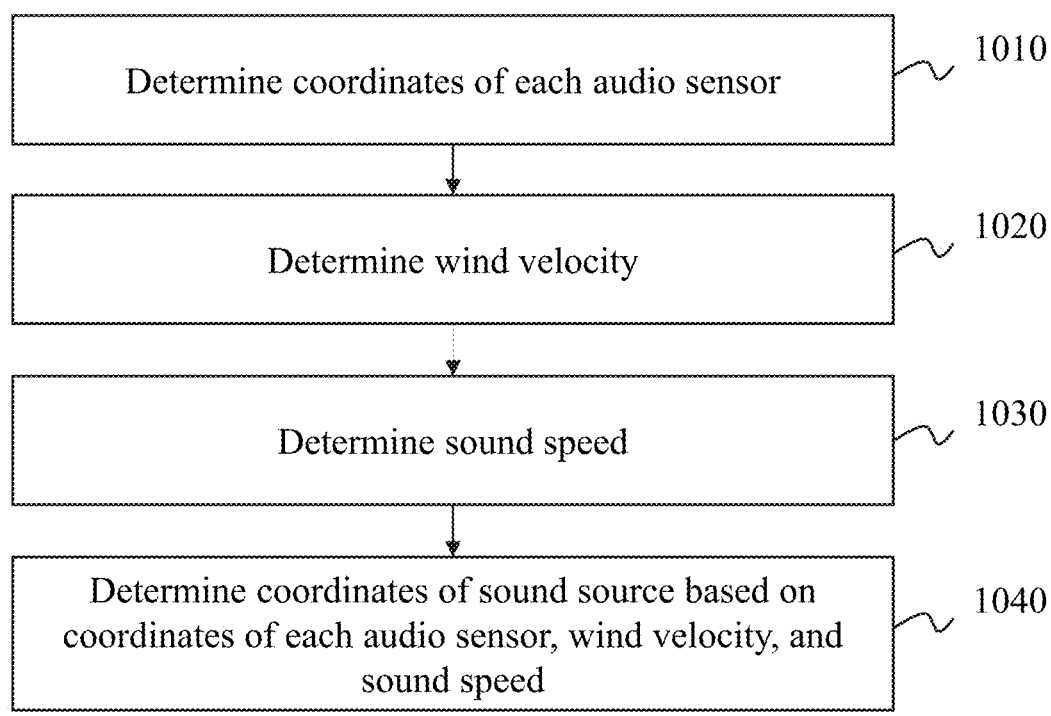
FIG. 10 is a flowchart illustrating an exemplary process for locating a sound source according to with some embodiments of the present disclosure.

FIG. 10 is a flowchart illustrating an exemplary process for locating a sound source of a detected sound signal in accordance with some embodiments of the present disclosure. The operation of locating a sound source may be determining coordinates of the sound source. In some embodiments, step 840 of process 800 may be performed based on process 1000 for determining coordinates of the sound source. Process 1000 may be performed by position determination module 350.

In 1010, coordinates of each of audio sensor(s) may be determined. In some embodiments, there may be more than one audio sensor of signal detection module 310. The audio sensors of signal detection module 310 may be arranged in any configuration. The audio sensors of signal detection module 310 may detect sound signals from any points in space.

In some embodiments, there may be four audio sensors (e.g., $S_1$, $S_2$, $S_3$, and $S_4$) of signal detection module 310. The four audio sensors may be same in performance (e.g., noise-signal ratio, sensitivity, and directionality, etc.). For example, the four audio sensors may be four microphones of a same model. Coordinates of each of the audio sensors of signal detection module 310 may be determined in a three-dimensional coordinate system, for example, $S_1$ $(x_i, y_1, z_1)$, $S_2$ $(x_2, y_2, z_2)$, $S_3$ $(x_3, y_3, z_3)$, and $S_4$ $(x_4, y_4, z_4)$. For each of the four audio sensors of signal detection module 310, a sound signal, for example, $S_1$ (t), $S_4$ (t), $S_4$ (t), and $S_4$ (t), may be detected.

In 1020, wind velocity may be determined. The wind velocity may be a vector and a combination of a wind speed and a wind direction. In some embodiments, there may be one or more auxiliary sensors of signal detection module 310. For example, the one or more auxiliary sensors may be a wind speed sensor, a wind direction sensor, or a wind velocity sensor, or a combination thereof. The one or more auxiliary sensors may be arranged near the more than one audio sensors of signal detection module 310. The one or more auxiliary sensors may be configured to detect reference information (e.g., a wind speed, a wind direction, and/or a wind velocity) for locating the sound source. For example, there may a wind speed sensor be configured to detect a wind speed near the place where signal detection module 310 is located, and a wind direction sensor be configured to detect a wind speed near the place where signal detection module 310 is located. As another example, there may be a wind velocity sensor be configured to detect a wind velocity near the place where signal detection module 310 is located.

In some embodiments, a wind velocity may be donated as $V_w(V_x, V_y, V_z)$.

In 1030, a sound speed may be determined. The sound speed may be a sound speed of the place where signal detection module 310 is located. The sound speed may be determined by a detection of a sound speed sensor arranged in a place where signal detection module 310 is located. The sound speed may be donated as C.

In 1040, coordinates of the sound source may be determined based on coordinates of each audio sensor, the wind velocity and the determined sound speed.

In some embodiments, a sound source at a position T (x, y, z) may be detected by four audio sensors at $S_1$ $(x_1, y_1, z_1)$, $S_2$ $(x_2, y_2, z_2)$, $S_3$ $(x_3, y_3, z_3)$, and $S_4$ $(x_4, y_4, z_4)$. Four sound signal detected by the four audio sensors may refer to $S_1$ (t), $S_2$ (t), $S_3$ (t), and $S_4$ (t). For each of the four audios sensor, an initial time may be set, for example, $t_1$, $t_2$, $t_3$, and $t_4$. The time of the sound signal be detected by each of the four audio sensors of signal detection module 310 may be $t_1+t_p$, $t_2+t_p$, $t_3+t_p$, and $t_4+t_p$. Where $t_p$ may be a time interval of the time of the sound source generate a sound and the time of the audio sensors detect a sound signal of the sound generated by the sound source. The coordinates of the sound source may be determined according to the coordinates of the four audio sensors, the wind velocity $V_w$ ($V_x$, $V_y$, $V_z$) and the determined sound speed C.

In some embodiments, the coordinates of the sound source may be determined based on the coordinates of the three audio sensors and the determined sound speed C. For example, the coordinates of the sound (x, y, z) may be determined according to Equations (5)-(8) below:

$$l1 = \sqrt{(x1-x)^2 + (y1-y)^2 + (z1-z)^2},\quad (5)$$

$$l2 = \sqrt{(x2-x)^2 + (y2-y)^2 + (z2-z)^2},\quad (6)$$

$$l3 = \sqrt{(x3-x)^2 + (y3-y)^2 + (z3-z)^2},\quad (7)$$

$$\begin{cases} t2-t1 = \dfrac{l2-l1}{c} \\ t3-t2 = \dfrac{l3-l2}{c} \\ t3-t1 = \dfrac{l3-l1}{c} \end{cases} \quad (8)$$

It should be noted that process 1000 described above is provided for the purposes of illustration, and not intended to limit the scope of the present disclosure. Apparently for persons having ordinary skills in the art, numerous variations and modifications may be conducted under the teaching of the present disclosure. However, those variations and modifications do not depart the protecting scope of the present disclosure. In some embodiments, step 1020 may be omitted and in 1040 coordinates of sound source may be determined based on coordinates of each audio sensor and the determined sound speed. In some embodiments, step 1020 may be optional. As shown in Equations (5)-(8), the coordinates of the sound source may be determined based on the coordinates of the audio sensors and the sound speed. Similar modifications should fall within the scope of the present disclosure.

FIG. 11 illustrates a schematic diagram of two audio sensors and a ball camera according to some embodiments of the present disclosure. Audio sensors 1110 and 1120 may be installed on a head of a ball camera 1130. A distance between the audio sensors may be pre-determined. In some embodiments, the distance (d2 shown in FIG. 11) between the audios sensors may be smaller than a diameter (d1 shown in FIG. 11) of the ball camera. In some embodiments, the distance between the audios sensors may be greater, smaller or equal to a radius of the ball camera. In some embodiments, an orientation of the audio sensors may be a direction of which the audio sensors may be set initial. In some embodiments, the orientation of the audio sensors may be defined as a direction that is perpendicular to a line segment d2 connecting two audio sensors 1110 and 1120 and departs from a diameter d1 of ball camera 1130 that is parallel to d2.

The direction of a sound source may be determined based on the orientation of audio sensors 1110 and 1120. For example, a sound source S' may be determined in the same direction of the orientation of the audio sensors 1110 and 1120 if an angle of a line connecting the sound source S' and audio sensor 1110 (or audio sensor 1120) and the orientation of the audio sensors 1110 and 1120 is smaller than 90°. As another example, a sound source S may be determined in the opposite direction of the orientation of the audio sensors 1110 and 1120 if an angle of a line connecting the sound source S' and audio sensor 1110 (or audio sensor 1120) and the orientation of the audio sensors 1110 and 1120 is larger than 90°.

FIG. 12 is an exemplary ball camera with audio sensors according to some embodiments of the present disclosure. Two audio sensors 1110 and 1120 may be installed on a head of a ball camera 1130. A head may support camera 1130 and audio sensors 1110 and 1120 may move together with the ball camera. In some embodiment, audio sensors 1110 and 1130 may be set on a center line of the ball camera symmetrically, wherein the audio sensors located on opposite sides of the ball camera.

The ball camera may be a high-speed ball camera (0-360 degrees per second), a medium-speed ball camera (0-60 degrees per second), a low-speed ball camera (0-30 degrees per second), or the like, or a combination thereof. In some embodiments, the ball camera may be used in a home security system, a traffic security system, a public security system, a factory production security system, or the like, or a combination thereof. The ball camera may set on a roof by a holder, a wall space by the holder, a ceiling without the holder, or the like, or a combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method for locating a sound source, the method comprising:
    detecting, by each of two audio sensors, a sound signal of a sound source;
    converting the detected sound signals from a time domain to a frequency domain;
    determining a high frequency ratio of each of the sound signals in the frequency domain; and
    determining a direction of the sound source based on the high frequency ratios.

2. The method of claim 1, wherein the two audio sensors are installed on a head of a ball camera.

3. The method of claim 2, wherein a distance between the two audio sensors is smaller than a diameter of the ball camera.

4. The method of claim 1, wherein the determining the high frequency ratios of the sound signals in the frequency domain includes:
    dividing the each of the sound signals into a plurality of frames;
    determining a high frequency ratio of each of the plurality of frames; and
    determining an average high frequency ratio based on the high frequency ratios of the plurality of frames.

5. The method of claim 1, wherein the determining the direction of the sound source based on the high frequency ratios of the sound signal includes:
   determining an orientation of the two audio sensors; and
   determining the direction of the sound source based on the orientation of the two audio sensors.

6. The method of claim 5, the determining the direction of the sound source based on the orientation of the audio sensor includes:
   determining whether a difference of the high frequency ratios of the sound signals is higher than a threshold; and
   if the difference of the high frequency ratios of the sound signal is higher than the threshold, setting the direction of the sound source as a same direction of the orientation of the two audio sensors.

7. The method of claim 5, the determining the direction of the sound source based on the orientation of the audio sensor includes:
   determining whether a difference of the high frequency ratios of the sound signals is lower than a threshold; and
   if the difference of the high frequency ratios of the sound signal is lower than the threshold, setting the direction of the sound source as an opposite direction of the orientation of the two audio sensors.

8. The method of claim 1, further includes:
   obtaining an image relating to the sound source; and
   determining a sound making behavior based on the image and the sound signals.

9. The method of claim 8, the sound making behavior is a honking behavior of a vehicle driver.

10. The method of claim 8, the image relating to the sound source is a video relating to the sound source within a time period of before and after the sound making behavior occurs.

11. The method of claim 1, further includes:
   recognizing the sound based on a feature of the sound signal, the feature of the sound signal including at least one of a frequency feature, a wave shape feature, a sound volume feature, a time feature, or a voiceprint feature.

12. The method of claim 11, wherein the recognizing the sound based on the feature of the sound signal includes:
   determining a voiceprint feature of the sound signal;
   obtaining a voiceprint feature associated with a known sound; and
   comparing the voiceprint feature of the sound signal with the voiceprint feature associated with the known sound.

13. A system comprising:
   a sound signal detection module configured to detect, by each of two audio sensors, a sound signal of a sound;
   a sound signal conversion module configured to convert the detected sound signals from a time domain to a frequency domain;
   a sound signal analysis module configured to determine a high frequency ratio of each of the sound signals in the frequency domain; and
   a position determination module configured to determine a direction of the sound source based on the high frequency ratios of the sound signals in the frequency domain.

14. The system of claim 13, further includes:
   a sound recognition module configured to recognize the sound based on the sound signal;
   an image acquisition module configured to obtain an image relating to the sound source; and
   an image analysis module configured to determine a sound making behavior based on the image and the recognized sound.

15. The system of claim 14, the determining, by the position determination module, the direction of the sound source based on the orientation of the audio sensor includes:
   determining whether a difference of the high frequency ratios of the sound signals is higher than a threshold; and
   if the difference of the high frequency ratios of the sound signal is higher than the threshold, setting the direction of the sound source as a same direction of the orientation of the two audio sensors.

16. The system of claim 14, the determining, by the position determination module, the direction of the sound source based on the orientation of the audio sensor includes:
   determining whether a difference of the high frequency ratios of the sound signals is lower than a threshold; and
   if the difference of the high frequency ratios of the sound signal is lower than the threshold, setting the direction of the sound source as a opposite direction of the orientation of the two audio sensors.

17. The system of claim 13, wherein the two audio sensors are installed on a head of a ball camera, and a distance between the two audio sensors is smaller than a diameter of the ball camera.

18. The system of claim 13, wherein determining, by the sound signal analysis module, a high frequency ratio of each of the sound signals in the frequency domain includes:
   for each of the sound signals,
      dividing the each of sound signal into a plurality of frames;
      determining a high frequency ratio of each of the plurality of frames; and
      determining an average high frequency ratio based on the high frequency ratios of the plurality of frames.

19. The system of claim 13, wherein determining, by the position determination module, the direction of the sound source based on the high frequency ratios of the sound signal includes:
   determining an orientation of the two audio sensors; and
   determining the direction of the sound source based on the orientation of the two audio sensors.

20. A non-transitory computer readable medium embodying a computer program product, the computer program product comprising instructions configured to cause a computing device to:
   detect, by each of two audio sensors, a sound signal of a sound source;
   convert the detected sound signals from a time domain to a frequency domain;
   determine a high frequency ratio of each of the sound signals in the frequency domain; and
   determine a direction of the sound source based on the high frequency ratios of the sound signals in the frequency domain.

* * * * *